(12) United States Patent
Lin et al.

(10) Patent No.: US 11,852,947 B2
(45) Date of Patent: Dec. 26, 2023

(54) ELECTROPHORETIC DISPLAY DEVICE AND DRIVING METHOD THEREOF

(71) Applicant: AUO Corporation, Hsinchu (TW)

(72) Inventors: Chun-Yu Lin, Hsinchu (TW); Yu-Pin Kuo, Hsinchu (TW); Kun-Cheng Tien, Hsinchu (TW)

(73) Assignee: AUO Corporation, Hsinchu (TW)

( * ) Notice: Subject to any disclaimer, the term of this patent is extended or adjusted under 35 U.S.C. 154(b) by 0 days.

(21) Appl. No.: 17/884,573

(22) Filed: Aug. 10, 2022

(65) Prior Publication Data
US 2023/0305354 A1    Sep. 28, 2023

(30) Foreign Application Priority Data

Mar. 28, 2022    (TW) .................................. 111111585

(51) Int. Cl.
  *G02F 1/16755*    (2019.01)
  *G02F 1/1685*    (2019.01)
  *G02F 1/1676*    (2019.01)
  *G02F 1/1333*    (2006.01)
  *G02F 1/1343*    (2006.01)
  *G02F 1/167*    (2019.01)
  *G02F 1/1677*    (2019.01)
  (Continued)

(52) U.S. Cl.
  CPC .... *G02F 1/16755* (2019.01); *G02F 1/133357* (2021.01); *G02F 1/134309* (2013.01); *G02F 1/167* (2013.01); *G02F 1/1676* (2019.01); *G02F 1/1685* (2019.01); *G02F 1/133514* (2013.01); *G02F 1/133553* (2013.01); *G02F 1/1677* (2019.01); *G02F 2001/1678* (2013.01)

(58) Field of Classification Search
None
See application file for complete search history.

(56) References Cited

U.S. PATENT DOCUMENTS

2003/0021005 A1*  1/2003  Liang ...................... G02F 1/167
                                                              359/296
2003/0117016 A1*  6/2003  Ukigaya .............. G09G 3/3446
                                                              305/107

(Continued)

FOREIGN PATENT DOCUMENTS

CN      201886252        6/2011
CN      201886252 U  *  6/2011
(Continued)

*Primary Examiner* — Ryan Crockett
(74) *Attorney, Agent, or Firm* — JCIPRNET

(57) ABSTRACT

An electrophoretic display device includes a first component substrate, a second component substrate, a display medium layer, and an isolation structure. The first component substrate includes a first carrier and a plurality of pixel electrodes. The pixel electrodes are arranged in an array on the first carrier. The second component substrate includes a second carrier and at least one common electrode. The at least one common electrode is overlapped with the pixel electrodes. The display medium layer and the isolation structure are located between the first carrier and the second carrier. The display medium layer includes a plurality of charged particles. The isolation structure includes a barrier structure and an isolation electrode. The isolation electrode is formed on a bottom surface of the barrier structure and adjacent to the display medium layer.

16 Claims, 11 Drawing Sheets

(51) Int. Cl.
*G02F 1/1335* (2006.01)
*G02F 1/1675* (2019.01)

(56) References Cited

U.S. PATENT DOCUMENTS

| | | | |
|---|---|---|---|
| 2005/0007651 A1* | 1/2005 | Liang | G02F 1/1679 |
| | | | 359/296 |
| 2006/0087490 A1* | 4/2006 | Ding | G02F 1/1677 |
| | | | 345/107 |
| 2006/0119568 A1 | 6/2006 | Ikeda | |
| 2006/0215253 A1* | 9/2006 | Kanbe | G02F 1/1679 |
| | | | 359/296 |
| 2018/0356657 A1* | 12/2018 | Xu | G02F 1/133553 |
| 2021/0328168 A1 | 10/2021 | Park et al. | |

FOREIGN PATENT DOCUMENTS

| CN | 110476109 | 11/2019 |
|---|---|---|
| CN | 112415828 | 2/2021 |
| CN | 113540177 | 10/2021 |

\* cited by examiner

ELECTROPHORETIC DISPLAY DEVICE AND DRIVING METHOD THEREOF

CROSS-REFERENCE TO RELATED APPLICATION

This application claims the priority benefit of Taiwan application Ser. No. 111111585, filed on Mar. 28, 2022. The entirety of the above-mentioned patent application is hereby incorporated by reference herein and made a part of this specification.

BACKGROUND

Technical Field

The disclosure relates to an electrophoretic display device and a driving method thereof.

Description of Related Art

In recent years, due to the ongoing vigorous development of various display technologies, after continuous research and development, products, such as electrophoretic displays, liquid crystal displays, plasma displays, organic light emitting diode (OLED) displays, and so forth, have been gradually commercialized and applied to display devices having various sizes and occupying various areas. With the increasing popularity of portable electronic products, flexible displays, e.g., electronic paper (e-paper), electronic book (e-book), and so on, have gradually attracted the attention of the market. Generally, the e-paper and the e-books display images by adopting the electrophoretic display technology. In the electrophoretic display provided in the related art, charged particles in a display medium are applied to reflect an external light source, thereby enabling sub-pixels to display a desired grayscale.

SUMMARY

The disclosure provides an electrophoretic display device capable of solving an issue of interference between sub-pixels.

The disclosure provides a driving method of an electrophoretic display device for solving an issue of interference between sub-pixels.

At least one embodiment of the disclosure provides an electrophoretic display device that includes a first component substrate, a second component substrate, a display medium layer, and an isolation structure. The first component substrate includes a first carrier and a plurality of pixel electrodes, and the pixel electrodes are arranged in an array on the first carrier. The second component substrate includes a second carrier and at least one common electrode, and the at least one common electrode is overlapped with the pixel electrodes. The display medium layer is located between the first carrier and the second carrier and includes a plurality of charged particles. The isolation structure includes a barrier structure and an isolation electrode. The isolation electrode is formed on a bottom surface of the barrier structure and adjacent to the display medium layer.

At least one embodiment of the disclosure provides a driving method of an electrophoretic display device, and the driving method includes following steps. The electrophoretic display device is provided. A first voltage difference between one of the pixel electrodes and the at least one common electrode is generated. A second voltage difference between the one of the pixel electrodes and the isolation electrode is generated, so that an electric field repelling the charged particles is generated on the isolation electrode.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1A:
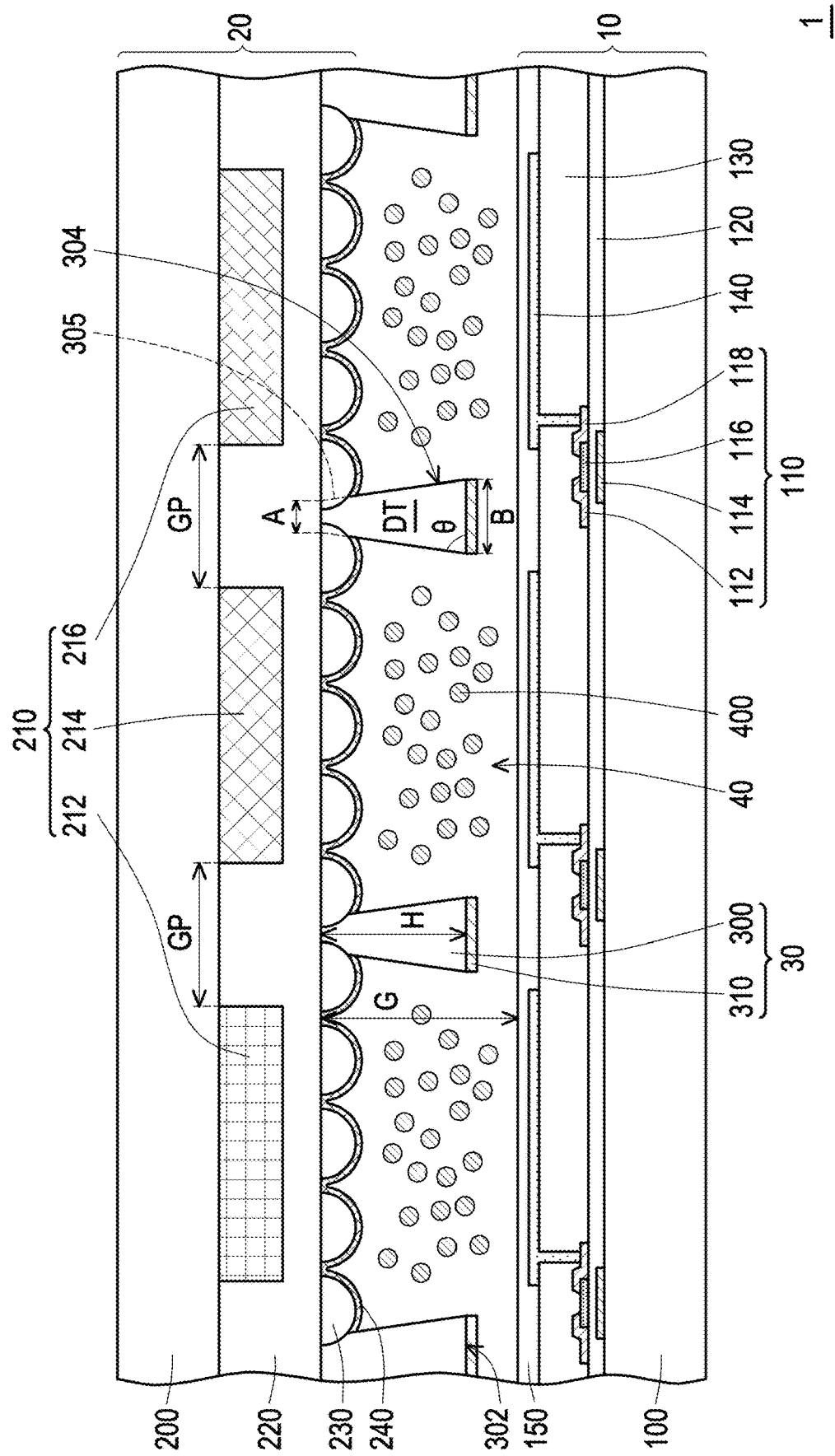
FIG. 1A is a schematic cross-sectional view illustrating an electrophoretic display device according to an embodiment of the disclosure.
Figure 1B:
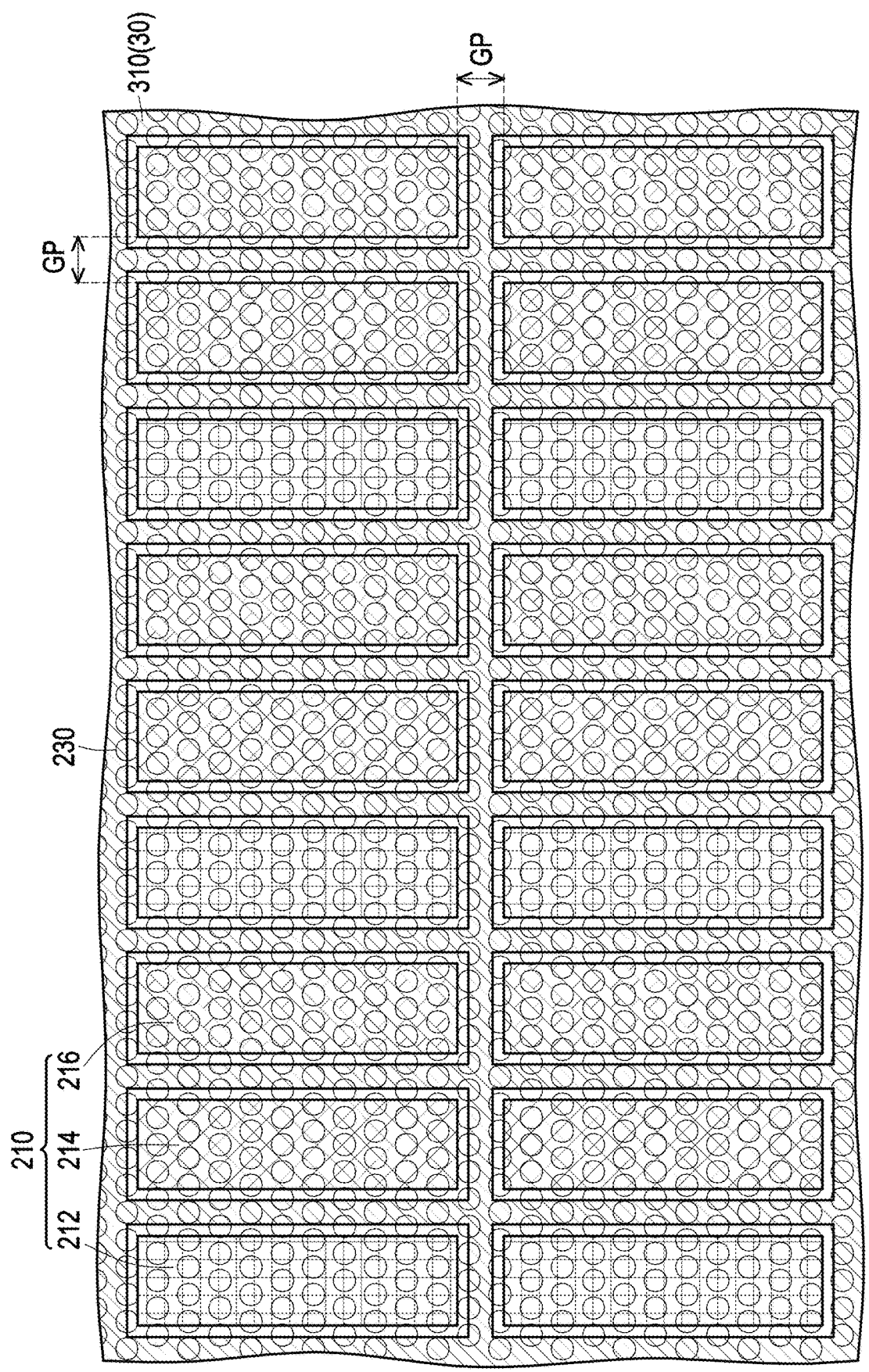
FIG. 1B is a schematic top view illustrating the electrophoretic display device depicted in FIG. 1A.

FIG. 1A is a schematic cross-sectional view illustrating an electrophoretic display device according to an embodiment of the disclosure. FIG. 1B is a schematic top view illustrating the electrophoretic display device depicted in FIG. 1A.

With reference to FIG. 1A and FIG. 1B, an electrophoretic display device 10 includes a first component substrate 10, a second component substrate 20, an isolation structure 30, and a display medium layer 40.

The first component substrate 10 includes a first carrier and a plurality of pixel electrodes 140. In this embodiment, the first component substrate further includes a plurality of active components 110, a first insulation layer 120, a second insulation layer 130, and a third insulation layer 150.

A material of the first carrier 100 includes glass, quartz, organic polymer, or an opaque/reflective material (e.g., a conductive material, metal, wafer, ceramics, or other applicable materials), or other applicable materials. When the conductive material or metal is applied, the first carrier 100 is covered by an insulation layer (not shown) to avoid short circuit problems.

The active components 110 are arranged in an array on the first carrier 100. Each active component 110 includes a gate 114, a channel layer 116, a source 112, and a drain 118. The gate 114 is overlapped with the channel layer 116, and the first insulating layer 120 is sandwiched between the gate 114 and the channel layer 116. The source 112 and the drain 118 are located on the first insulating layer 120 and electrically connected to the channel layer 116.

In this embodiment, the active components 110 are, for instance, bottom-gate thin film transistors (TFTs), which should however not be construed as a limitation in the disclosure. In other embodiments, the active components 110 may also be top-gate TFTs, double-gate TFTs, or TFTs of other types.

In some embodiments, materials of the gate 114, the source 112, and the drain 118 include, for instance, chromium, gold, silver, copper, tin, lead, hafnium, tungsten, molybdenum, neodymium, titanium, tantalum, aluminum, zinc, and other metals, alloy of the above metals, oxides of the above metals, nitrides of the above metals, a combination of the above, or other conductive materials. In some embodiments, a material of the channel layer 116 includes, for instance, amorphous silicon, polysilicon, microcrystalline silicon, monocrystalline silicon, an organic semiconductor material, an oxide semiconductor material, e.g., indium zinc oxide (IZO), indium gallium zinc oxide (IGZO), other suitable materials, or a combination of the above materials, other suitable materials, or a combination of the above materials.

The second insulation layer 130 is located on the active components 110, and the second insulation layer 130 has an opening overlapping the drains 118 of the active components 110.

The pixel electrodes 140 are arranged in an array on the first carrier 100. In this embodiment, the pixel electrodes 140 are located on the second insulation layer 130 and fill the opening of the second insulation layer 130, so as to be electrically connected to the drains 118 of the active components 110. In this embodiment, each sub-pixel includes a corresponding pixel electrode 140 and a corresponding active component 110. In some embodiments, the pixel electrodes 140 includes a transparent electrode (e.g., indium tin oxide (ITO), IZO, aluminum tin oxide (ATO), aluminum zinc oxide (AZO), IGZO, or other transparent conductive materials), a reflective electrode (e.g., metal), or other conductive materials. The third insulation layer 150 is located on the pixel electrodes 140 and covers the pixel electrodes 140.

The second component substrate 20 includes a second carrier 200 and at least one common electrode 240. In this embodiment, the second component substrate 20 further includes a color filter component 210, a planarization layer 220, and a plurality of protruding micro-structures 230.

A material of the second carrier 200 includes glass, quartz, organic polymer, or other applicable transparent materials.

The color filter component 210 is located between the first carrier 100 and the second carrier 200. In this embodiment, the color filter component 210 is formed on the second carrier 200, which should however not be construed as a limitation in the disclosure. In other embodiments, other insulation layers, passivation layers, and/or buffer layers are sandwiched between the color filter component 210 and the second carrier 200. In this embodiment, the color filter component 210 includes a blue filter component 212, a green filter component 214, and a red filter component 216. The blue filter component 212, the green filter component 214, and the red filter component 216 are separated from one another.

The planarization layer 220 is located on the color filter component 210. The planarization layer 220 covers the color filter component 210. The protruding micro-structures 230 are formed on the planarization layer 220, and the protruding micro-structures 230 protrude toward the display medium layer 40. In this embodiment, the protruding micro-structures 230 are arranged in an array on the planarization layer 220. In some embodiments, the protruding micro-structures 230 include a photoresist material, and a method of forming the protruding micro-structures 230 includes performing a photolithographic process once. For instance, the protruding micro-structures 230 are formed by performing the photolithographic process for three times, and one third of the amount of the protruding micro-structures 230 is formed each time; therefore, the protruding micro-structures 230 formed by performing the photolithographic process each time may have greater pitches therebetween, thereby improving the manufacturing yield. The planarization layer 220 and the protruding micro-structures 230 include transparent materials. For instance, the planarization layer 220 and the protruding micro-structures 230 include resin, photoresist materials, or other transparent materials.

The at least one common electrode 240 is formed on the protruding micro-structures 230. In this embodiment, the at least one common electrode 240 is directly formed on the protruding micro-structures 230, which should however not be construed as a limitation in the disclosure. In other embodiments, a buffer layer may be included between the at least one common electrode 240 and the protruding micro-structures 230. The at least one common electrode 240 has an undulating surface corresponding to the protruding micro-structures 230. The at least one common electrode 240 is conformal to the protruding micro-structures 230, for instance. The at least one common electrode 240 is overlapped with the pixel electrodes 140. In some embodiments, the at least one common electrode 240 includes a transparent electrode, e.g., ITO, IZO, ATO, AZO, IGZO, or other conductive materials.

The display medium layer 40 is located between the first carrier 100 and the second carrier 200. The display medium layer 40 includes a plurality of charged particles 400. The charged particles 400 are, for instance, particles carrying negative or positive charges, and the charged particles 400 include a light absorbing material. On the condition that no electric field is applied, the charged particles 400 are dispersed in an electrophoresis solution of the display medium layer 40.

The isolation structure 30 is located between the first carrier 100 and the second carrier 200. In this embodiment, the isolation structure 30 is located between the protruding micro-structures 230 and the third insulation layer 150. The isolation structure 30 includes a barrier structure 300 and an isolation electrode 310.

The barrier structure 300 is directly formed on the protruding micro-structures 230 and/or the at least one common electrode 240. The barrier structure 300 includes a reflective material. In some embodiments, the barrier structure 300 includes a photoresist material and reflective particles dispersed in the photoresist material, e.g., porous (or air-containing) silicon oxide ($SiO_2$), titanium oxide ($TiO_2$), aluminum oxide ($Al_2O_3$), calcium carbonate ($CaCO_3$), barium sulfate ($BaSO_4$), zirconia ($ZrO_2$), metal-coated polymer particles, hollow polymer particles, or other particles that can reflect light. In other embodiments, the barrier structure 300 includes a photoresist material and a reflective layer formed on the surface of the photoresist material. In some embodiments, a method of forming the barrier structure 300 includes a photolithographic process.

A portion of the display medium layer 40 is located between a bottom surface 302 of the barrier structure 300 and the first component substrate 10. In this embodiment, an included angle θ between a side surface 304 of the barrier structure 300 and the bottom surface 302 of the barrier structure 300 is less than 90 degrees; hence, a line width of the barrier structure 300 increases while the barrier structure approaches the first component substrate 10, thereby reducing the probability of the mutual interference between the charged particles 400 of different sub-pixels. Specifically, since the line width of the barrier structure 300 is relatively large when the barrier structure 300 is relatively close to the first component substrate 10, a length of a gap between the barrier structure 300 and the third insulation layer 150 is relatively long, so that the charged particles 400 are less likely to pass through the gap between the barrier structure 300 and third insulation layer 150. As such, an issue of uneven brightness resulting from the different number of the charged particles 400 in different sub-pixels may be prevented. In some embodiments, the included angle θ includes an acute angle or a rounded angle.

According to the embodiment depicted in FIG. 1A, in a cross-sectional structure of the electrophoretic display device 1, a virtual trapezoid DT includes the bottom surface 302 of the barrier structure 300, the side surfaces 304 of the barrier structure 300, virtual connecting lines 305 extending from the side surfaces 304 of the barrier structure to the planarization layer 220, and a surface of the planarization layer 220 between the virtual connecting lines 305. Here, a width of the surface of the planarization layer 220 between the virtual connecting lines 305 is A, a width of the bottom surface 302 of the barrier structure 300 is B, a height of the virtual trapezoid DT is H, and A 2H×cot(80°)≤B≤A 2H×cot (10°). In some embodiments, a maximum thickness of the barrier structure 300 is H, a maximum thickness of the display medium layer 40 is G, and 0.55G≤H≤0.95G. In some embodiments, the width B is greater than the width A, wherein the width B is, for instance, 1 micrometer to 500 micrometers, and the width A is, for instance, 0.67 micrometer to 100 micrometers. In some embodiments, the thickness is, for instance, 0.95 micrometer to 35.2 micrometers.

In the cross-sectional view in FIG. 1A, the at least one common electrode 240 includes a plurality of portions separated by the barrier structure 300; however, in some embodiments, the at least one common electrode 240 partially extends between the barrier structure 300 and the protruding micro-structures 230 (not shown), so that the portions of the at least one common electrode 240 are connected to each other.

The isolation electrode 310 is formed on the bottom surface 302 of the barrier structure 300 and adjacent to the display medium layer 40. In this embodiment, the isolation electrode 310 directly contacts the display medium layer 40, which should however not be construed as a limitation in the disclosure. In this embodiment, a width of the isolation electrode 310 is less than or equal to the bottom surface 302 of the barrier structure 300. In other words, the isolation electrode 310 completely or partially covers the bottom surface 302 of the barrier structure 300. In some embodiments, the isolation electrode 310 includes a transparent electrode (e.g., ITO, IZO, ATO, AZO, IGZO, or other transparent conductive materials), a reflective electrode (e.g., metal), or other conductive materials. The isolation electrode 310, the at least one common electrode 240, and the pixel electrodes 140 are separated from one another. Therefore, different voltages may be applied to the isolation electrode 310, the at least one common electrode 240, and the pixel electrodes 140, so as to create an electric field between the isolation electrode 310 and the at least one common electrode 240, between the isolation electrode 310 and the pixel electrodes 140, and between the pixel electrodes 140 and the at least one common electrode 240.

With reference to FIG. 1A and FIG. 1B, in the top view in FIG. 1B, the isolation structure 30 has a mesh shape. In this embodiment, both the barrier structure 300 and the isolation electrode 310 of the isolation structure 30 have a mesh shape. An orthogonal projection of the isolation structure 30 on the second carrier 200 is overlapped with a gap GP of an orthogonal projection of the color filter component 210 on the second carrier 200. In other words, the orthogonal projection of the isolation structure 30 on the second carrier 200 is located among orthogonal projections of the blue filter component 212, the green filter component 214, and the red filter component 216 on the second carrier 200.

The orthogonal projection of the isolation structure 30 on the second carrier 200 is smaller than or equal to the gap GP of the orthogonal projection of the color filter component 210 on the second carrier 200. In this embodiment, the orthogonal projection of the isolation structure 30 on the second carrier 200 is smaller than the gap GP of the orthogonal projection of the color filter component 210 on the second carrier 200; hence, when the electrophoretic display device 1 is observed from the front (observed from top to bottom in FIG. 1A), a portion of the at least one common electrode 240 and the protruding micro-structures 230 are located between the color filter component 210 and the isolation structure 30, so as to enhance white light reflected by the electrophoretic display device 1 and accordingly improve reflectivity and brightness of the electrophoretic display device 1.

Figure 2A:
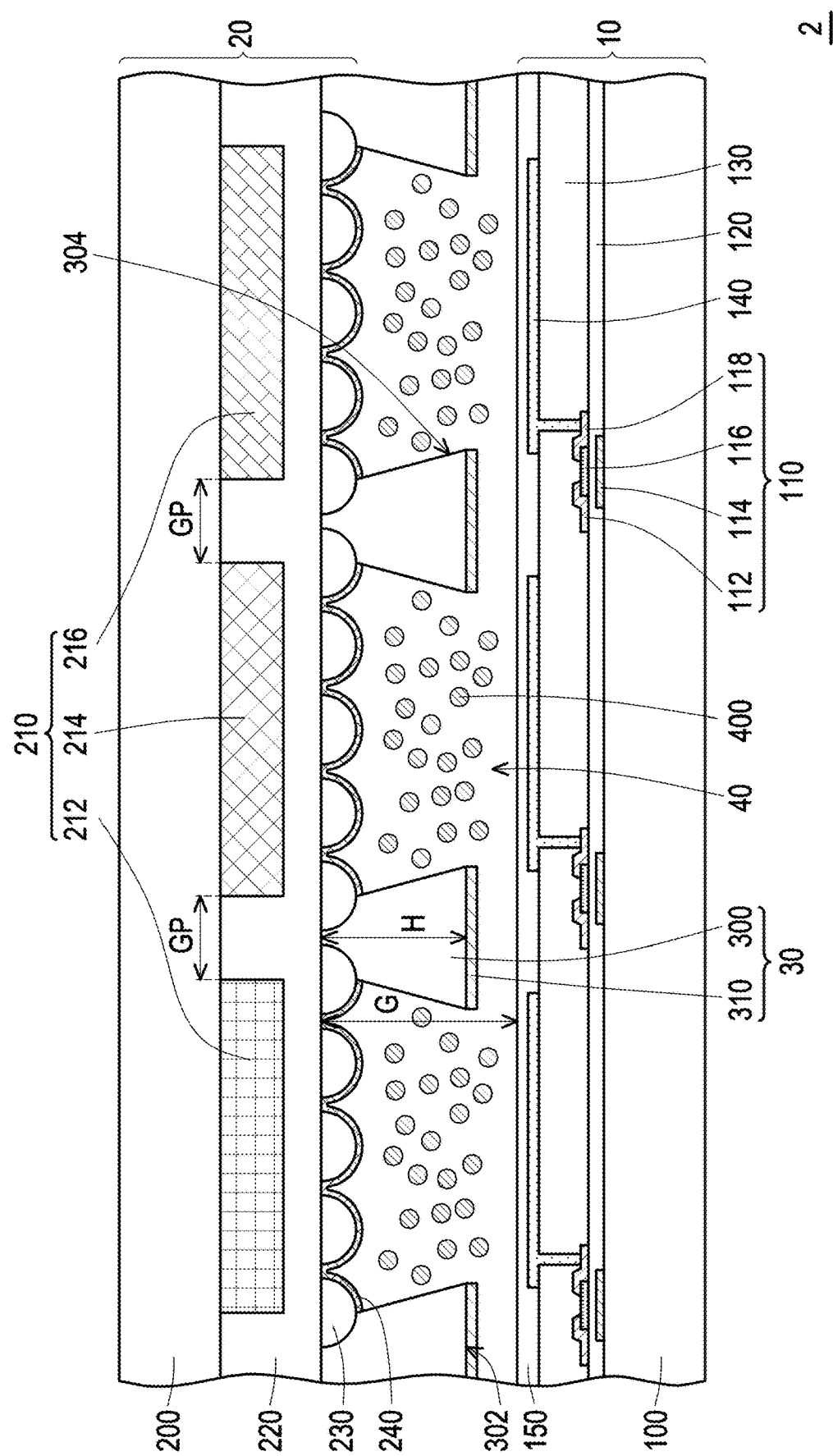
FIG. 2A is a schematic cross-sectional view illustrating an electrophoretic display device according to an embodiment of the disclosure.
Figure 2B:
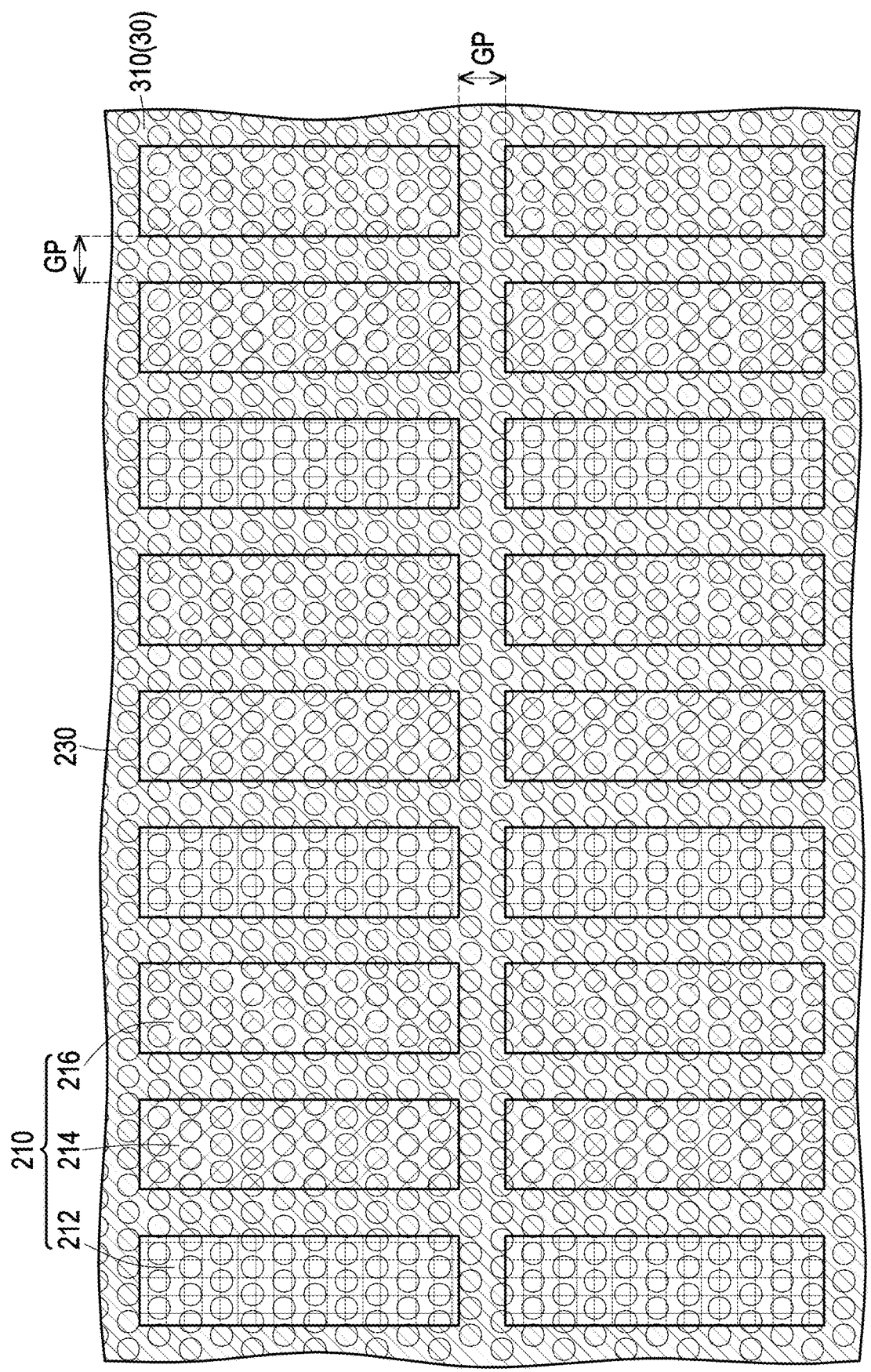
FIG. 2B is a schematic top view illustrating the electrophoretic display device depicted in FIG. 2A.

FIG. 2A is a schematic cross-sectional view illustrating an electrophoretic display device according to an embodiment of the disclosure. FIG. 2B is a schematic top view illustrating the electrophoretic display device depicted in FIG. 2A.

It should be mentioned that the reference numbers and some content in the embodiment depicted in FIG. 2A and FIG. 2B are derived from the reference numbers and some content in the embodiment depicted in FIG. 1A and FIG. 1B, where the same or similar reference numbers serve to represent the same or similar components, and the description of the same technical content is omitted. For the description of the omitted part, reference may be made to the foregoing embodiments, which will not be repeated here.

The main difference between an electrophoretic display device 2 depicted in FIG. 2A and FIG. 2B and the electrophoretic display device 1 depicted in FIG. 1A and FIG. 1B lies in that the orthogonal projection of the isolation structure 30 of the electrophoretic display device 2 on the second carrier 200 is greater than or equal to the gap GP of the orthogonal projection of the color filter component 210 on the second carrier 200.

In this embodiment, when the electrophoretic display device 2 is observed from the front (observed from top to bottom in FIG. 2A), there is no common electrode 240 nor protruding micro-structures 230 between the color filter component 210 and the isolation structure 30, so as to reduce the white light reflected by the electrophoretic display device 2 and accordingly improve the color volume of the electrophoretic display device 2.

Figure 3A:
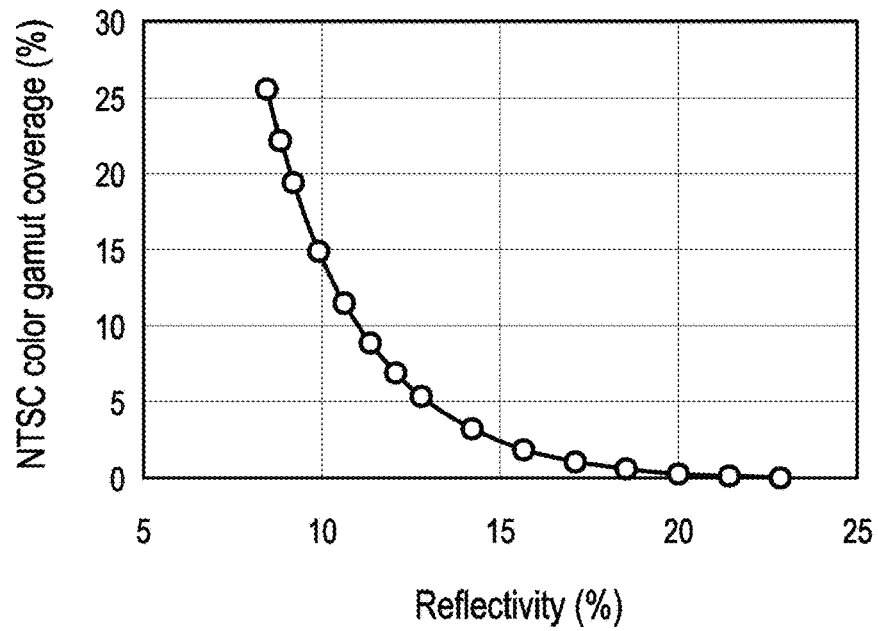
FIG. 3A illustrates data of relationship between an NTSC color gamut coverage and a reflectivity of an electrophoretic display device according to some embodiments of the disclosure.
Figure 3B:
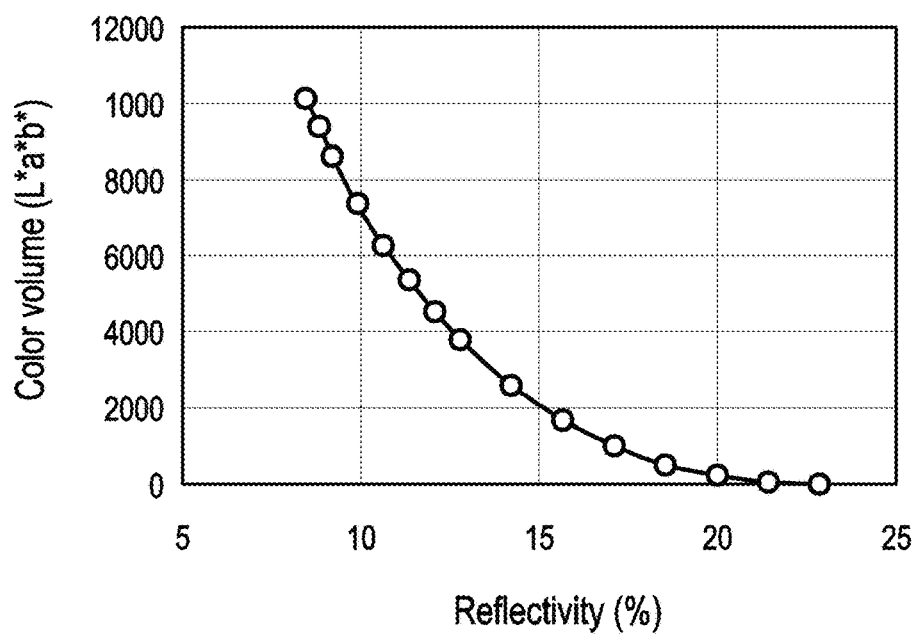
FIG. 3B illustrates data of relationship between a color volume (L*a*b)) and a reflectivity of an electrophoretic display device according to some embodiments of the disclosure.

FIG. 3A illustrates data of relationship between an NTSC color gamut coverage and a reflectivity of an electrophoretic display device according to some embodiments of the disclosure. FIG. 3B illustrates data of relationship between a color volume (L*a*b) and a reflectivity of an electrophoretic display device according to some embodiments of the disclosure. The structure of the electrophoretic display device in FIG. 3A and FIG. 3B may be referred to as the electrophoretic display device 1 in FIG. 1A and FIG. 1B and the electrophoretic display device 2 in FIG. 2A and FIG. 2B.

As shown in FIG. 3A and FIG. 3B, the reflectivity of the electrophoretic display device is adjusted by changing the width of the isolation structure and/or the width of the gap of the color filter component. In some embodiments, the larger the width of the isolation structure and the width of the gap of the color filter component, the greater the reflectivity of the electrophoretic display device; the smaller the width of the isolation structure and the width of the gap of the color filter component, the lower the reflectivity of the electrophoretic display device.

From the data shown in FIG. 3A and FIG. 3B, it is known that the NTSC color gamut coverage and the color volume (L*a*b*) of the electrophoretic display device increase together with the decrease in the reflectivity of the electrophoretic display device.

Figure 4A:
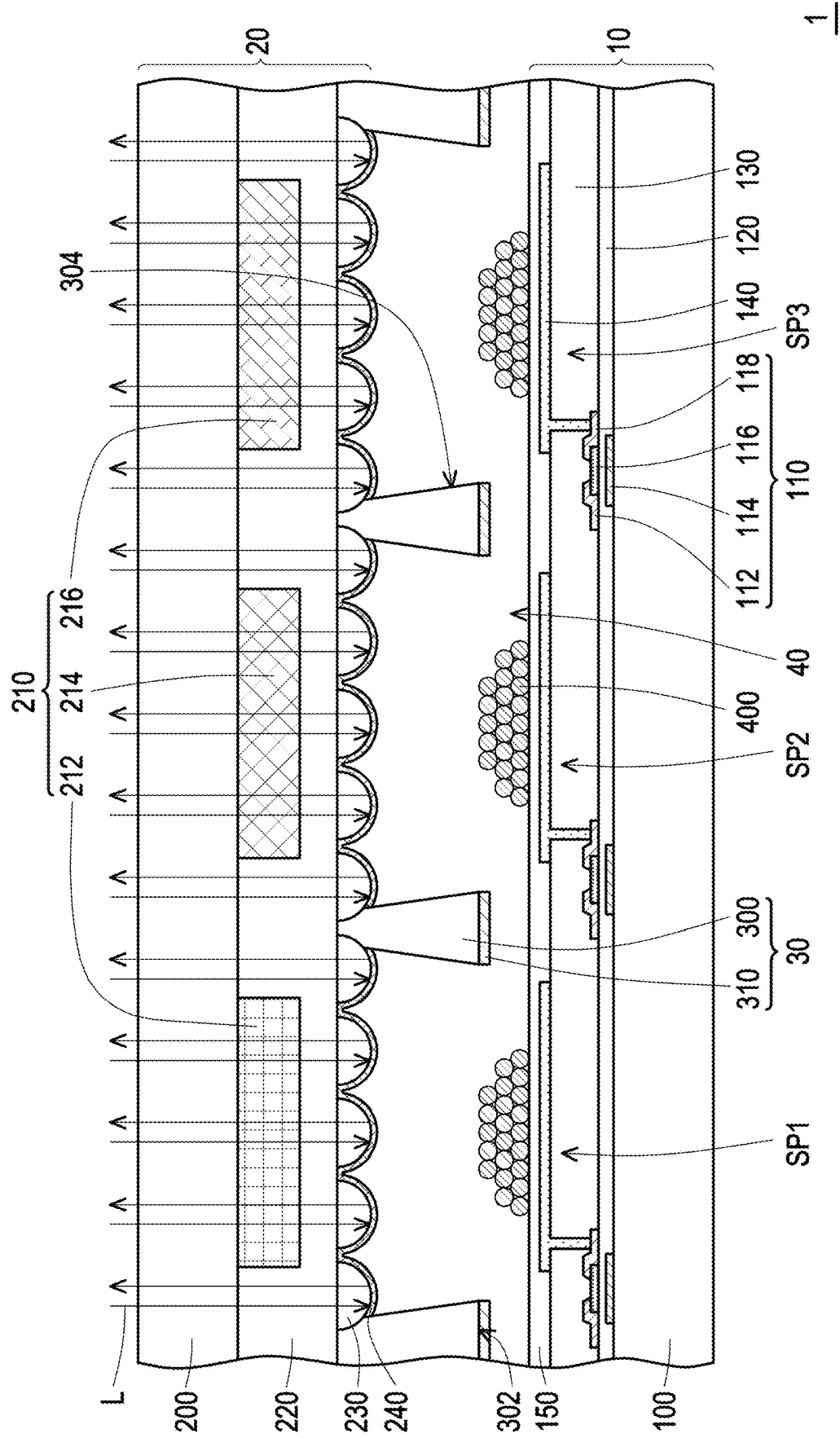
FIG. 4A to FIG. 4E are schematic cross-sectional views illustrating a driving method of an electrophoretic display device according to an embodiment of the disclosure.
Figure 4B:
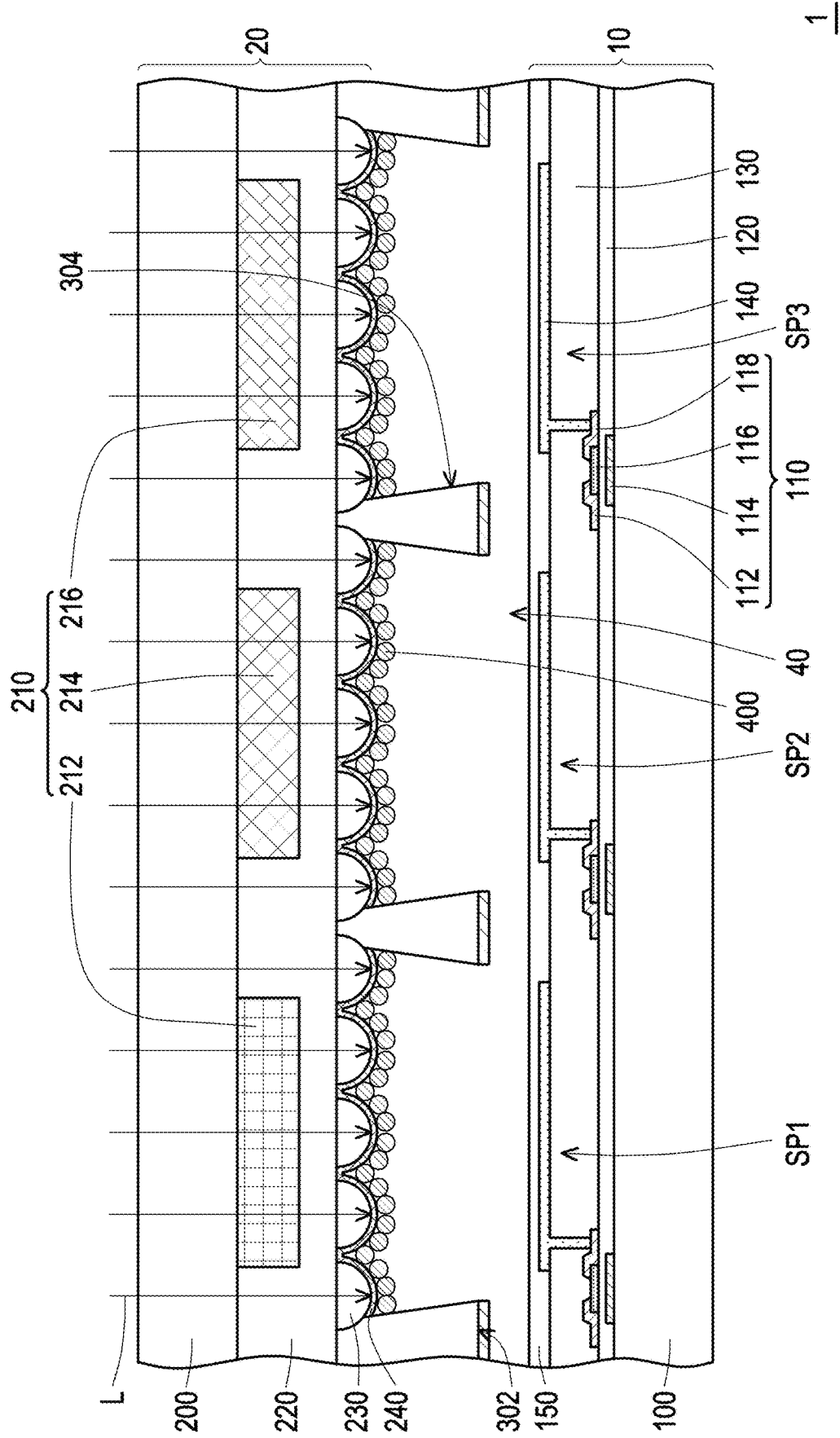

FIG. 4A to FIG. 4E are schematic cross-sectional views illustrating a driving method of an electrophoretic display device according to an embodiment of the disclosure. It should be mentioned that the reference numbers and some content in the embodiment depicted in FIG. 4A and FIG. 4B are derived from the reference numbers and some content in the embodiment depicted in FIG. 1A and FIG. 1B, where the same or similar reference numbers serve to represent the same or similar components, and the description of the same technical content is omitted. For the description of the omitted part, reference may be made to the foregoing embodiments, which will not be repeated here.

With reference to FIG. 4A, a first voltage difference is generated between at least one of the pixel electrodes 140 and the at least one common electrode 240, so that an electric field attracting the charged particles is generated on the at least one of the pixel electrodes 140. A second voltage difference is generated between the at least one of the pixel electrodes 140 and the isolation electrode 310, so that an electric field repelling the charged particles 400 is generated on the isolation electrode 310.

In some embodiments, the charged particles 400 carry negative charges, a first voltage is applied to the pixel electrode 140 of a first sub-pixel SP1, the pixel electrode 140 of a second sub-pixel SP2, and the pixel electrode 140 of a third sub-pixel SP3, a second voltage is applied to the at least one common electrode 240, and a third voltage is applied to the isolation electrode 310, where the third voltage is less than the second voltage, the second voltage is less than the first voltage, and the first voltage, the second voltage, and the third voltage are all less than 30 volts and greater than −30 volts.

In some embodiments, the charged particles 400 carry positive charges, the first voltage is applied to the pixel electrode 140 of the first sub-pixel SP1, the pixel electrode 140 of the second sub-pixel SP2, and the pixel electrode 140 of the third sub-pixel SP3, the second voltage is applied to the at least one common electrode 240, and the third voltage is applied to the isolation electrode 310, where the third voltage is greater than the second voltage, the second voltage is greater than the first voltage, and the first voltage, the second voltage, and the third voltage are all less than 30 volts and greater than −30 volts.

In this embodiment, a refractive index of the protruding micro-structures 230 (e.g., greater than or equal to 1.52 and less than or equal to 2.4) is higher than a refractive index of the electrophoresis solution of the display medium layer 40 (e.g., greater than or equal to 1 and less than or equal to 1.52).

In some embodiments, when the refractive index of the at least one common electrode 240 is greater than or equal to the refractive index of the protruding micro-structures 230, the total reflection of an external light beam L occurs at an interface between the display medium layer 40 and the at least one common electrode 240.

In some embodiments, when the refractive index of the at least one common electrode 240 ranges from the refractive index of the protruding micro-structures 230 to the refractive index of the electrophoresis solution of the display medium layer 40, the total reflection of the external light beam L occurs at both the interface between the protruding micro-structures 230 and the at least one common electrode 240 and the interface between the display medium layer 40 and the at least one common electrode 240.

In some embodiments, when the refractive index of the at least one common electrode 240 is less than or equal to the refractive index of the electrophoresis solution of the display medium layer 40, the total reflection of the external light beam L occurs at the interface between the protruding micro-structures 230 and the at least one common electrode 240.

A portion of the external light beam 1, passes through the blue filter component 212, the green filter component 214, and/or the red filter component 216 to generate the color to be displayed. With reference to FIG. 4A, the external light beam L passes through the blue filter component 212, the green filter component 214, and the red filter component 216 and enables the first sub-pixel SP1, the second sub-pixel SP2, and the third sub-pixel SP3 to respectively generate blue, green, and red light. As shown in FIG. 4A, a portion of the external light beam L does not pass through the color filter component 210 and is reflected at the interface between the display medium layer 40 and the at least one common electrode or on the surface of the isolation structure 30. If the external light beam L is white light, the light reflected by the isolation structure 30 is white light.

With reference to FIG. 4B, a third voltage difference is generated between at least one of the pixel electrodes 140 and the at least one common electrode 240, so that the electric field repelling the charged particles is generated on the at least one of the pixel electrodes 140. A fourth voltage difference is generated between the at least one of the pixel electrodes 140 and the isolation electrode 310, so that the electric field repelling the charged particles 400 is generated on the isolation electrode 310.

In some embodiments, the charged particles 400 carry the negative charges, a fourth voltage is applied to the pixel electrode 140 of the first sub-pixel SP1, the pixel electrode 140 of the second sub-pixel SP2, and the pixel electrode 140 of the third sub-pixel SP3, the second voltage is applied to the at least one common electrode 240, and the third voltage is applied to the isolation electrode 310, where the third voltage is less than the fourth voltage, the fourth voltage is less than the second voltage, and the second voltage, the third voltage, and the fourth voltage are all less than 30 volts and greater than −30 volts.

In some embodiments, the charged particles 400 carry the positive charges, the fourth voltage is applied to the pixel electrode 140 of the first sub-pixel SP1, the pixel electrode 140 of the second sub-pixel SP2, and the pixel electrode 140 of the third sub-pixel SP3, the second voltage is applied to the at least one common electrode 240, and the third voltage is applied to the isolation electrode 310, where the third voltage is greater than the fourth voltage, the fourth voltage is greater than the second voltage, and the second voltage, the third voltage, and the fourth voltage are all less than 30 volts and greater than −30 volts.

in FIG. 4B, the charged particles 400 are attracted to the interface between the display medium layer 40 and the at least one common electrode and absorb the external light beam L, so that the first sub-pixel SP1, the second sub-pixel SP2, and the third sub-pixel SP3 appear to be in a dark state.

Figure 4C:
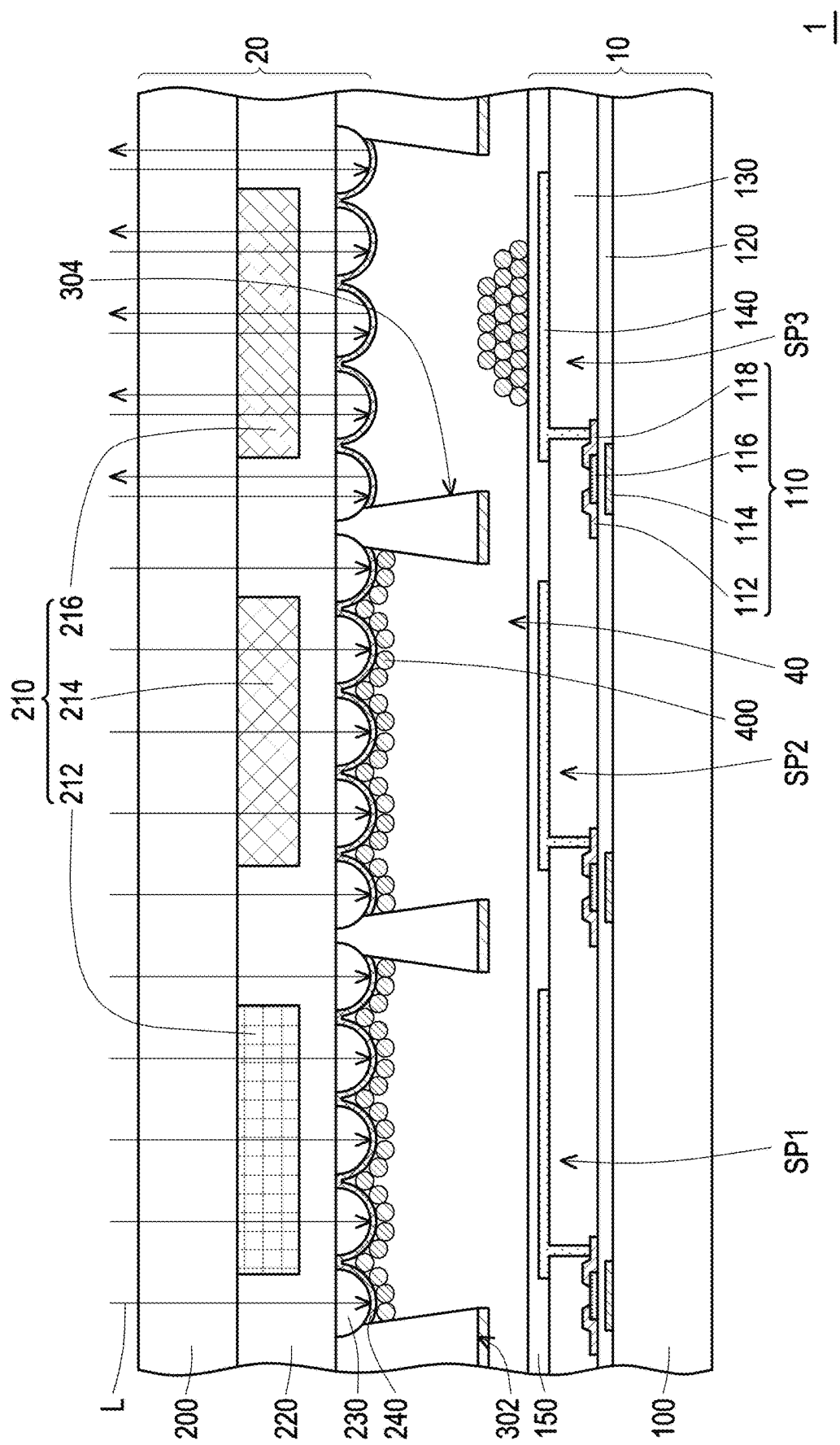

With reference to FIG. 4C, the first voltage is applied to the pixel electrode 140 of the third sub-pixel SP3, and the fourth voltage is applied to the pixel electrode 140 of the first sub-pixel SP1 and the pixel electrode 140 of the second sub-pixel SP2. The second voltage is applied to the at least one common electrode 240, and the third voltage is applied to the isolation electrode 310.

In this embodiment, the electric field attracting the charged particles 400 is generated on the pixel electrode 140 of the third sub-pixel SP3, and the electric field repelling the charged particles 400 is generated on the pixel electrode 140 of the first sub-pixel SP1, the pixel electrode 140 of the second sub-pixel SP2, and the isolation electrode 310.

As shown in FIG. 4C, the external light beam L is reflected after passing through the red filter component 216 and allows the third sub-pixel SP3 to generate the red light. In FIG. 4C, the charged particles 400 are attracted to the interface between the display medium layer 40 of the first sub-pixel SP1 and the second sub-pixel SP2 and the at least one common electrode and absorb the external light beam L, so that the first sub-pixel SP1 and the second sub-pixel SP2 appear to be in the dark state.

Figure 4D:
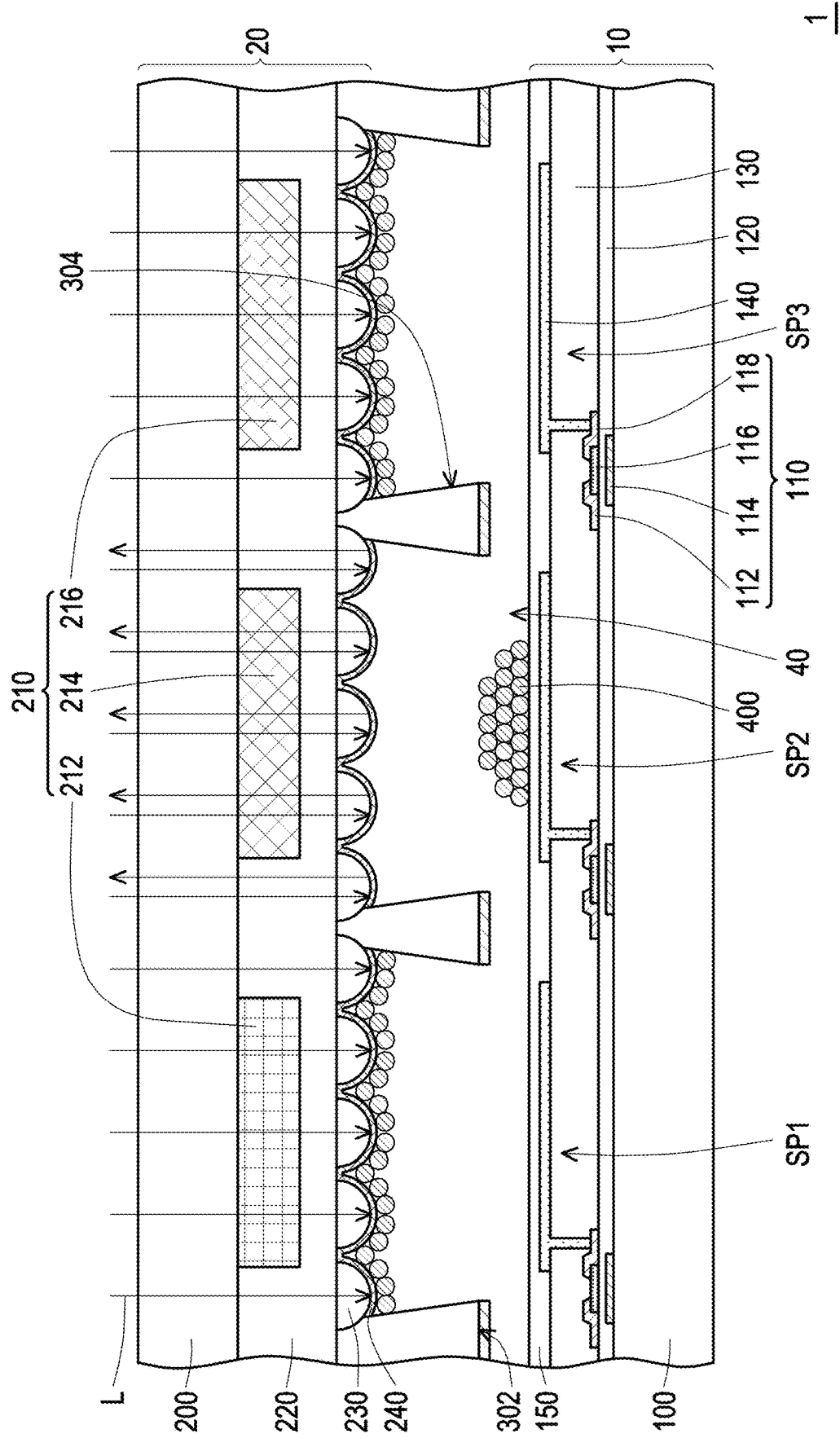

With reference to FIG. 4D, the first voltage is applied to the pixel electrode 140 of the second sub-pixel SP2, and the fourth voltage is applied to the pixel electrode 140 of the first sub-pixel SP1 and the pixel electrode 140 of the third sub-pixel SP3. The second voltage is applied to the at least one common electrode 240, and the third voltage is applied to the isolation electrode 310.

In this embodiment, the electric field attracting the charged particles 400 is generated on the pixel electrode 140 of the second sub-pixel SP2, and the electric field repelling the charged particles 400 is generated on the pixel electrode 140 of the first sub-pixel SP1, the pixel electrode 140 of the third sub-pixel SP3, and the isolation electrode 310.

As shown in FIG. 4D, the external light beam L is reflected after passing through the green filter component 214 and allows the second sub-pixel SP2 to generate the green light. In FIG. 4D, the charged particles 400 are attracted to the interface between the display medium layer 40 of the first sub-pixel SP1 and the third sub-pixel SP3 and the at least one common electrode 240 and absorb the external light beam L, so that the first sub-pixel SP1 and the third sub-pixel SP3 appear to be in the dark state.

Figure 4E:
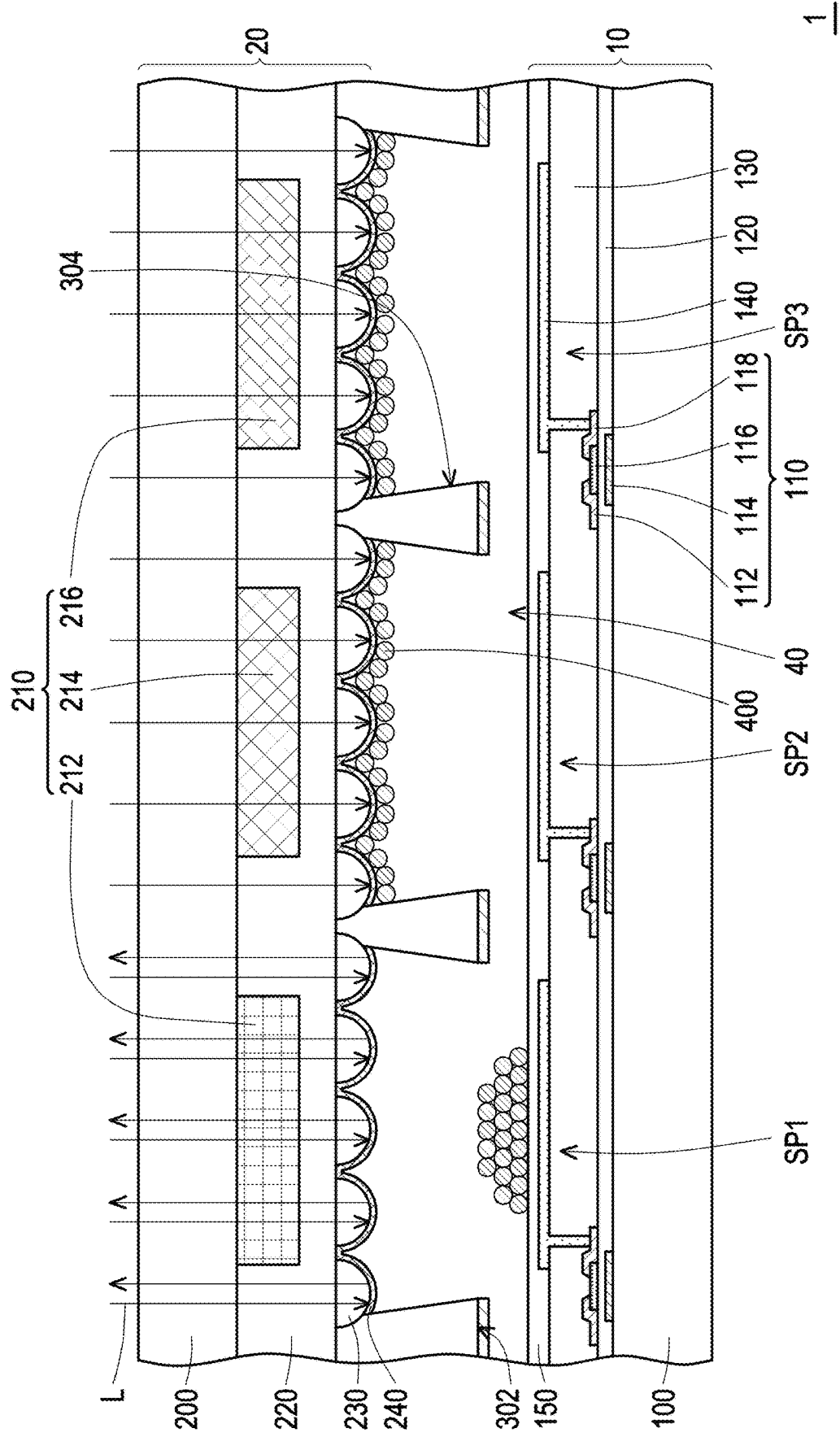

With reference to FIG. 4E, the first voltage is applied to the pixel electrode 140 of the first sub-pixel SP1, and the fourth voltage is applied to the pixel electrode 140 of the second sub-pixel SP2 and the pixel electrode 140 of the third sub-pixel SP3. The second voltage is applied to the at least one common electrode 240, and the third voltage is applied to the isolation electrode 310.

In this embodiment, the electric field attracting the charged particles 400 is generated on the pixel electrode 140 of the first sub-pixel SP1, and the electric field repelling the charged particles 400 is generated on the pixel electrode 140 of the second sub-pixel SP2, the pixel electrode 140 of the third sub-pixel SP3, and the isolation electrode 310.

As shown in FIG. 4E, the external light beam L is reflected after passing through the blue filter component 212 and allows the first sub-pixel SP1 to generate the blue light. In FIG. 4E, the charged particles 400 are attracted to the interface between the display medium layer 40 of the second sub-pixel SP2 and the third sub-pixel SP3 and the at least one common electrode and absorb the external light beam L, so that the second sub-pixel SP2 and the third sub-pixel SP3 appear to be in the dark state.

Figure 5:
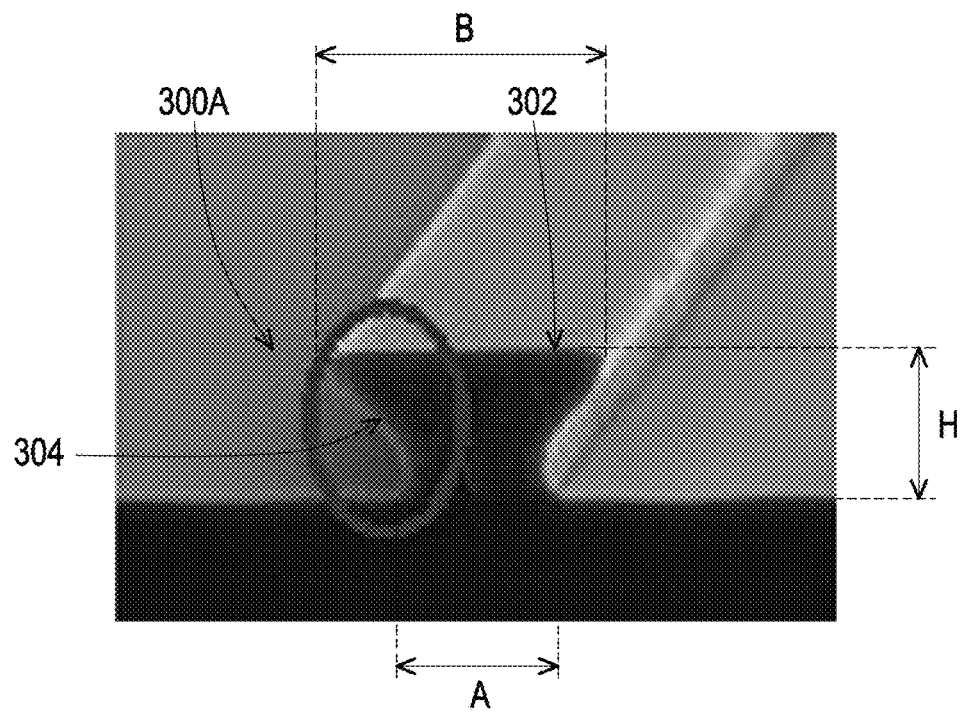
FIG. 5 is a micrograph of a barrier structure according to an embodiment of the disclosure.

FIG. 5 is a micrograph of a barrier structure according to an embodiment of the disclosure.

With reference to FIG. 5, a barrier structure 300A is formed by performing a photolithographic process. In this embodiment, the viscosity of the photoresist material forming the barrier structure 300A is 86 mPa·s, and the solid content (content of the reflective particles) is 65%. In this embodiment, the resultant barrier structure 300A has an optical density (OD) of 0.03/μm, a reflectivity (R % for a light beam with a wavelength of 450 nm) greater than 50% (e.g., 83.5%), and a transmittance (TT % for a light beam with a wavelength of 500 nm) greater than 10% (e.g., 20.2%). In some embodiments, the shape of the resultant barrier structure 300A is adjusted by adjusting the properties (e.g., the viscosity, the composition, and so on) of the photoresist material. As shown in FIG. 5, the included angle between the side surface 304 of the barrier structure 300A and the bottom surface 302 (the upper surface in FIG. 5) of the barrier structure 300A is less than 90 degrees. In FIG. 5, the ratio of the width B of the bottom surface 302 of the barrier structure 300A to the width A of the top surface (the lower surface in FIG. 5) is about 20 μm:14.4 μm. The thickness H of the barrier structure 300A in FIG. 5 is greater than 15 micrometers.

Figure 6:
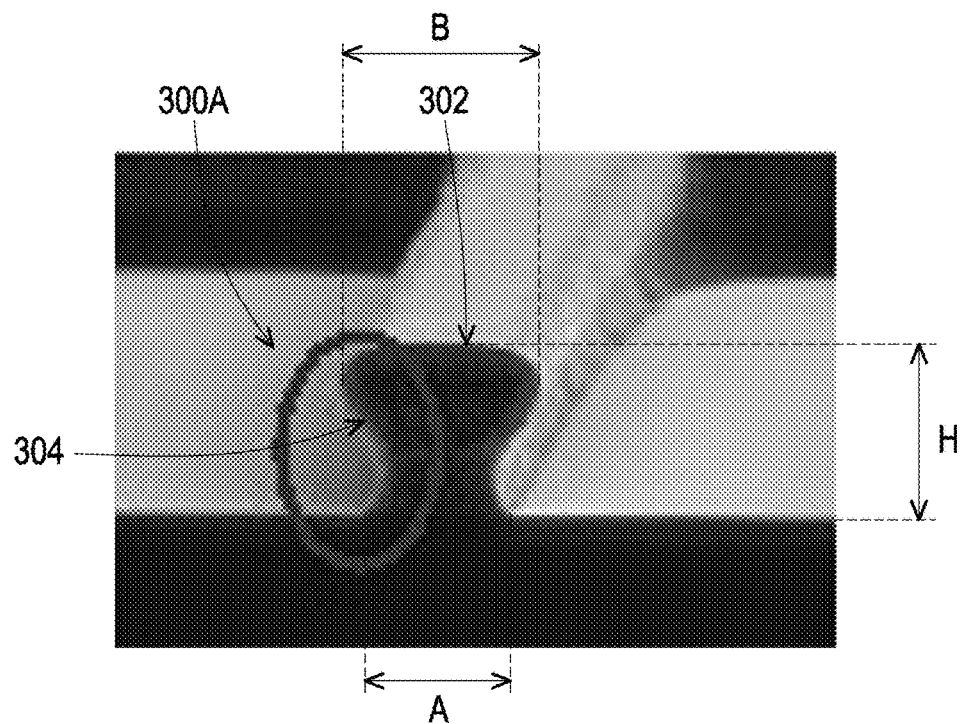
FIG. 6 is a micrograph of a barrier structure according to an embodiment of the disclosure.

FIG. 6 is a micrograph of a barrier structure according to an embodiment of the disclosure.

With reference to FIG. 6, a barrier structure 300B is formed by performing a photolithographic process. In this embodiment, the viscosity of the photoresist material forming the barrier structure 300B is 113 mPa·s, and the solid content (content of the reflective particles) is 65%. In this embodiment, the resultant barrier structure 300B has the OD of 0.08/μm, the reflectivity (R % for the light beam with a wavelength of 450 nm) less than 50% (e.g., 47.4%), and the transmittance (TT % for the light beam with a wavelength of 500 nm) less than 10% (e.g., 4.2%). In some embodiments, the shape of the resultant barrier structure 300B is adjusted by adjusting the properties (e.g., the viscosity, the composition, and so on) of the photoresist material. As shown in FIG. 6, a rounded angle exists between the side surface 304 of the barrier structure 300B and the bottom surface 302 (the upper surface in FIG. 6) of the barrier structure 300B. In FIG. 6, the ratio of the width B of the bottom surface 302 of the barrier structure 300B to the width A of the top surface (the lower surface in FIG. 6) is about 20 μm:16.4 μm. The thickness H of the barrier structure 300B in FIG. 6 is greater than 15 micrometers.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electrophoretic display device, comprising:
   a first component substrate, comprising:
      a first carrier; and a plurality of pixel electrodes, arranged in an array on the first carrier;
a second component substrate, comprising:
  a second carrier; and
  at least one common electrode, overlapped with the pixel electrodes;
a display medium layer, located between the first carrier and the second carrier and comprising a plurality of charged particles; and
an isolation structure, located between the first carrier and the second carrier and comprising:
  a barrier structure, wherein a width of a bottom portion of the barrier structure is greater than a width of an upper portion of the barrier structure; and
  an isolation electrode, formed on a bottom surface of the bottom portion of the barrier structure and adjacent to the display medium layer, wherein a portion of the display medium layer is located between the bottom surface of the bottom portion of the barrier structure and the first component substrate.

2. The electrophoretic display device according to claim 1, wherein a maximum thickness of the barrier structure is H, a maximum thickness of the display medium layer is G, and $0.55G \leq H \leq 0.95G$.

3. The electrophoretic display device according to claim 1, wherein the second component substrate comprises:
a planarization layer; and
a plurality of protruding micro-structures, formed on the planarization layer and protruding toward the display medium layer, wherein the at least one common electrode is formed on the protruding micro-structures.

4. The electrophoretic display device according to claim 3, wherein in a cross-sectional structure of the electrophoretic display device, a virtual trapezoid comprises the bottom surface of the barrier structure, side surfaces of the barrier structure, virtual connecting lines extending from the side surfaces of the barrier structure to the planarization layer, and a surface of the planarization layer between the virtual connecting lines, wherein a width of the surface of the planarization layer between the virtual connecting lines is A, a width of the bottom surface of the barrier structure is B, a height of the virtual trapezoid is H, and $A \; 2H \times \cot(80°) \leq B \leq A \; 2H \times \cot(10°)$.

5. The electrophoretic display device according to claim 3, wherein the barrier structure is directly formed on the protruding micro-structures and/or the at least one common electrode.

6. The electrophoretic display device according to claim 3, wherein the barrier structure has a mesh shape, and the isolation electrode has a mesh shape.

7. The electrophoretic display device according to claim 1, wherein the second component substrate comprises:
a color filter component, located between the first carrier and the second carrier, wherein an orthogonal projection of the isolation structure on the second carrier is overlapped with a gap of an orthogonal projection of the color filter component on the second carrier.

8. The electrophoretic display device according to claim 7, wherein the orthogonal projection of the isolation structure on the second carrier is smaller than or equal to the gap of the orthogonal projection of the color filter component on the second carrier.

9. The electrophoretic display device according to claim 1, wherein an angle less than 90 degrees is included between a side surface of the barrier structure and the bottom surface of the barrier structure.

10. The electrophoretic display device according to claim 1, wherein the barrier structure comprises a reflective material, and the charged particles comprise a light absorbing material.

11. A driving method of an electrophoretic display device, comprising:
providing the electrophoretic display device according to claim 1;
generating a first voltage difference between one of the pixel electrodes and the at least one common electrode; and
generating a second voltage difference between the one of the pixel electrodes and the isolation electrode, so that an electric field repelling the charged particles is generated on the isolation electrode.

12. The driving method of the electrophoretic display device according to claim 11, wherein a first voltage is applied to the one of the pixel electrodes, a second voltage is applied to the at least one common electrode, and a third voltage is applied to the isolation electrode, wherein the third voltage is less than the second voltage, and the second voltage is less than the first voltage, wherein the charged particles carry negative charges, and an electric field attracting the charged particles is generated on the one of the pixel electrodes.

13. The driving method of the electrophoretic display device according to claim 12, further comprising:
generating a third voltage difference between another of the pixel electrodes and the at least one common electrode, wherein a fourth voltage is applied to another of the pixel electrodes, and the second voltage is applied to the at least one common electrode; and
generating a fourth voltage difference between the another of the pixel electrodes and the isolation electrode, so that the electric field repelling the charged particles is generated on the isolation electrode, wherein the third voltage is applied to the isolation electrode, wherein the third voltage is less than the fourth voltage, the fourth voltage is less than the second voltage, and the electric field repelling the charged particles is generated on the another of the pixel electrodes.

14. The driving method of the electrophoretic display device according to claim 11, wherein a first voltage is applied to the one of the pixel electrodes, a second voltage is applied to the at least one common electrode, and a third voltage is applied to the isolation electrode, wherein the third voltage is greater than the second voltage, and the second voltage is greater than the first voltage, wherein the charged particles carry positive charges, and an electric field attracting the charged particles is generated on the one of the pixel electrodes.

15. The driving method of electrophoretic display device according to claim 14, further comprising:
generating a third voltage difference between another of the pixel electrodes and the at least one common electrode, wherein a fourth voltage is applied to the another of the pixel electrodes, and the second voltage is applied to the at least one common electrode; and
generating a fourth voltage difference between the another of the pixel electrodes and the isolation electrode, so that the electric field repelling the charged particles is generated on the isolation electrode, where the third voltage is applied to the isolation electrode, wherein the third voltage is greater than the fourth voltage, the fourth voltage is greater than the second voltage, and the electric field repelling the charged particles is generated on the another of the pixel electrodes.

16. An electrophoretic display device, comprising:
a first component substrate, comprising:
a first carrier; and
a plurality of pixel electrodes, arranged in an array on the first carrier;
a second component substrate, comprising:
a second carrier; and
at least one common electrode, overlapped with the pixel electrodes;
a display medium layer, located between the first carrier and the second carrier and comprising a plurality of charged particles; and
an isolation structure, located between the first carrier and the second carrier and comprising:
a barrier structure, wherein the barrier structure defines a plurality of accommodating spaces with narrow bottoms and wide tops, wherein the narrow bottoms of adjacent accommodating spaces are interconnected through an interval space between the isolation structure and the first component substrate, and the display medium layer fills into the accommodating spaces and the interval space; and
an isolation electrode, formed on a bottom surface of barrier structure and adjacent to the display medium layer.

* * * * *